Oct. 9, 1956        L. J. SEDIVY        2,765,570

FISH LURE

Filed Dec. 10, 1954

INVENTOR.
Leo J. Sedivy
BY
Att'y

United States Patent Office 2,765,570
Patented Oct. 9, 1956

2,765,570

FISH LURE

Leo J. Sedivy, San Francisco, Calif.

Application December 10, 1954, Serial No. 474,416

2 Claims. (Cl. 43—42.34)

This invention relates to improvements in fish lures.

The principal object of this invention is to provide a lure which will be attractive to fish.

A further object is to produce a lure which is economical to manufacture, one which takes a minimum amount of room and one which will have an attractive movement when drawn through the water so that fish will be inclined to strike at the same and become hooked on the hook secured thereto.

A further object is to provide a fish lure which has a combined wiggling and rocking movement when drawn through the water and which reflects the light rays to make the lure more attractive to fish.

Other objects and advantages will be apparent during the course of the following description.

In the accompanying drawings forming a part of this specification and in which like numbers are employed to designate like parts throughout the same, Fig. 1 is a top plan view of my lure;

Figure 1:
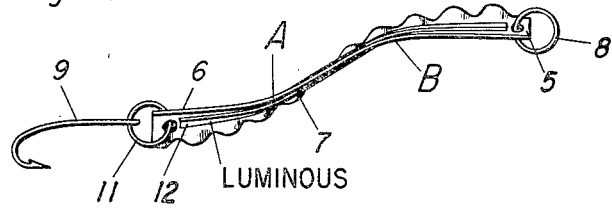
Figure 2:
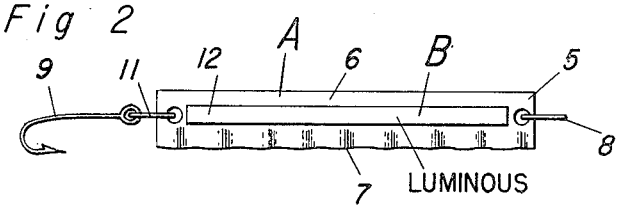
Fig. 2 is a side elevation of Fig. 1.
Figure 3:
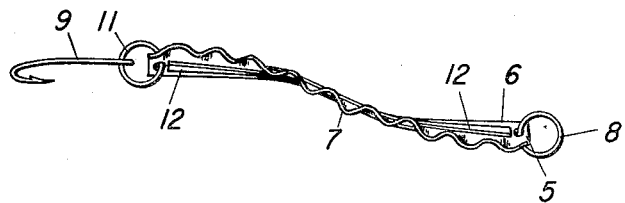
Fig. 3 is a bottom plan of Fig. 1.

By referring to the drawings it will be noted that my lure consists of an elongated body 5 formed of a thin strip of metal having one edge 6 thereof relatively smooth, while the opposite edge 7 is corrugated. When viewed in side elevation, as shown in Fig. 2, the body 5 is rectangular in shape. It will also be noted by viewing Fig. 1 that the smooth edge is bent as shown at A and B, and also twisted longitudinally as shown in Figs. 1 and 3 to impart a wiggle or twisting movement to the lure when drawn through the water, these bends being substantially at angles of 30 degrees, so that when links are placed at opposite ends and a line is connected to the link 8, while a hook 9 is connected to the link 11, there will be an offside pull, so to speak, which will cause the lure to wiggle, but not spin, in the water in a manner similar to that of a worm.

The fact that one edge is corrugated, while the other edge is smooth also sets up a still further rocking movement which, together with the first mentioned movement, is very attractive to fish.

On each side of the metal body 5 I secure in any suitable manner a luminous strip 12.

These strips in turn reflect light rays which are further attractive to the fish.

It will thus be noted that I have provided a lure which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A fish lure comprising an elongated narrow body strip of material rectangular in side elevation, one elongated edge thereof being smooth, the other elongated edge thereof being corrugated, and a luminous strip secured to each side of said body strip between the smooth and corrugated edges.

2. A fish lure comprising an elongated narrow body strip of material rectangular in side elevation, one elongated edge thereof being smooth, the other elongated edge thereof being corrugated, and a light reflecting element of luminous material secured to each side of said body strip between the smooth and corrugated edges, said body strip being bent to form portions arranged at an angle of substantially 30 degrees to each other.

References Cited in the file of this patent

UNITED STATES PATENTS

| | | |
|---|---|---|
| D. 174,680 | Conder et al. | May 10, 1955 |
| 1,317,890 | Patton | Oct. 7, 1919 |
| 1,609,090 | Knill | Nov. 30, 1926 |
| 1,862,917 | Anderson | June 14, 1932 |
| 2,631,397 | Angell | Mar. 17, 1953 |
| 2,691,839 | Duerig | Oct. 19, 1954 |

FOREIGN PATENTS

| | | |
|---|---|---|
| 180,891 | Switzerland | Apr. 1, 1936 |
| 501,758 | Canada | Apr. 20, 1954 |